June 20, 1961 V. L. CONRAD 2,989,309
JUMP SUPPORTING BLOCK
Filed Oct. 13, 1958
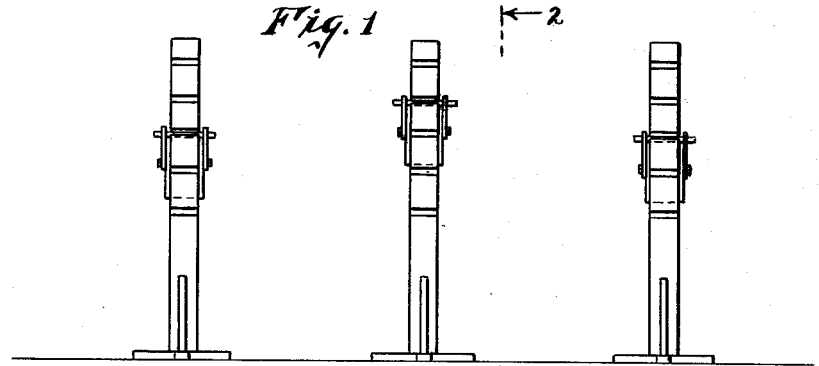
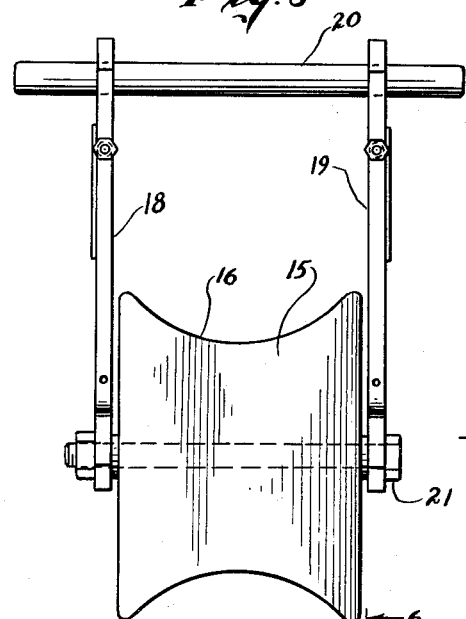
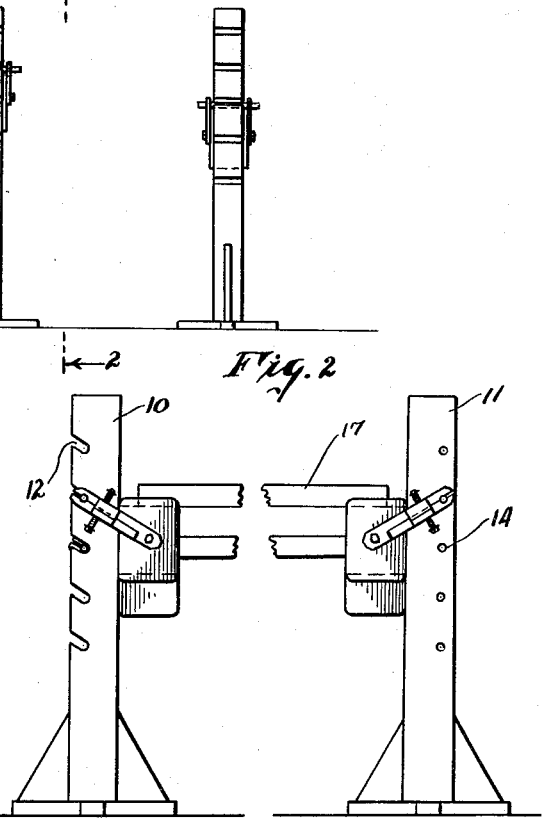
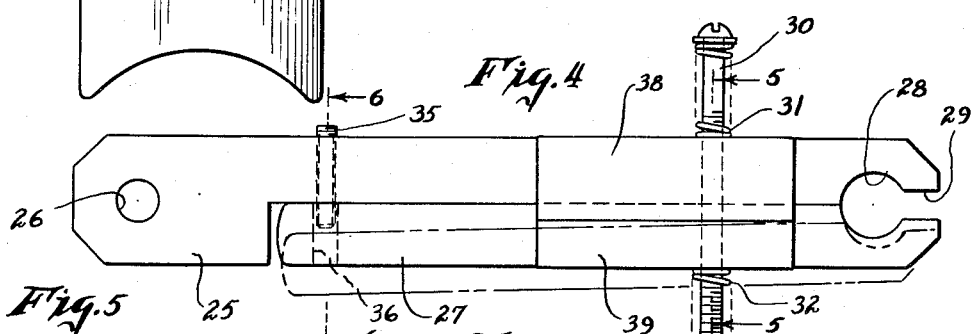
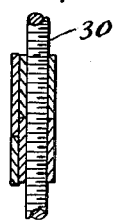
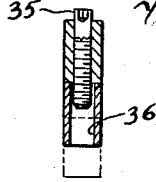
INVENTOR.
VICTOR L. CONRAD
BY *John H Glascum*
ATTORNEY United States Patent Office 2,989,309
Patented June 20, 1961

2,989,309
JUMP SUPPORTING BLOCK
Victor L. Conrad, 1 Raynor Road, Morristown, N.J.
Filed Oct. 13, 1958, Ser. No. 766,872
4 Claims. (Cl. 272—59)

This invention relates to a supporting block for jumps used in horse shows, training and exhibitions.

It is customary to support the bars in a show ring jump by means of either a supporting block or a spring lever fastened to a pair of standards. The conventional supporting block consists of a piece of wood which is held on the standard by a heavy wire or iron ring. The standards are normally notched to allow the block to be moved upwardly or lowered, depending on the desired height of the jump. The blocks are quite often grooved so that a pole may be rested upon them on their concave faces and supported thereby. In a single jump if a horse hits the bar the pole will be rolled out of the concave groove and fall to the ground. Where a spring type support is used it usually consists of a metal lever supported by a spring from which the pole will be dislodged should the horse hit the bar. This type of support is unsatisfactory since the bars used are quite heavy and therefore require a spring offering considerable resistance and which is subjected to considerable abuse.

A more serious problem arises where spread jumps are used, that is, a plurality of bars spaced apart laterally to require the horse not only to clear a height but to broad jump as well. If the horse fails to make the distance and comes down on the bars he is apt to break the bars and become entangled therewith with possible injury to the animal and to the rider, particularly from the ends of the broken bars.

An object of the invention is to provide a bar support—sometimes called a bucket—which will be so constructed that if a horse lands on the bars it will release and allow the bars to drop directly to the ground, thus not only minimizing breakage but preventing injury to the horse and rider.

A further object is to provide a support of the type described which will not only immediately release the bars but which may be readily reset and put back in place.

Other objects and advantages of the invention will become apparent from the accompanying drawings, in which—

FIG. 1 is a side elevation of a spread jump.

FIG. 2 is a sectional view taken on the line 2—2 of FIG. 1.

FIG. 3 is a plan view of a jump bar supporting block assembly.

FIG. 4 is a detailed view of one of the supporting members.

FIG. 5 is a cross sectional view taken on the line 5—5 of FIG. 4.

FIG. 6 is a cross sectional view taken on the line 6—6 of FIG. 4.

In the practice of my invention I employ standards 10 or 11 which function in a very similar manner except that the standards 10 are notched at 12 while the standards 11 are provided with holes 14 to receive the pin of the supporting member. It will be understood that where a single jump is to be set up only one pair of standards is necessary, but that where a spaced jump, such as the well-known triple bar, is used a greater number of standards—two for each set of bars—will be necessary.

To support the bars on the upright standards I provide a block 15 which has concave surfaces 16 adapted to support the bars 17. The block 15 is positioned on the uprights 10 or 11 by means of a pair of arms 18 and 19 and a pin 20 which extends either through the openings 14 or rests in the notched portions 12 and which can be moved upwardly or lowered, depending upon the height desired for the particular jump. A bolt 21, or similar pin, extends through the block 15 to position it against the standards. In the past a U-shaped piece of heavy wire has been used to perform this function and, as previously pointed out, if a horse should come down on the bar either the block or bar had to break or the animal would be strung up on the jump.

In my present invention the arms 18 and 19 consist of a rigid metal member 25 having an opening 26 to receive the bolt 21 and having a cooperating member or lever 27 forming at the other end of the arm an opening 28 to receive the pin 20. The opening 28 has an open mouth 29 forming a pair of jaws. The cooperating member or lever 27 is connected to the member 25 by means of the bolt 30 which is positioned through both members, and bears the springs 31 and 32 which urge the members together. The tension on the springs may be varied by tightening the nut 33 on the bolt 31 so that the pressure needed to force the lever 27 away from the rigid member 25 to open the mouth 29 can be predetermined.

In order to guide the movement of the lever 27 with relation to the member 25, I provide a pin 35 which extends through the member 25 and into a recess 36 in the lever 27. I also provide a pair of abutting plates 38 and 39 with the plate 38 extending below the member 25 so that when the mouth 29 is forced open and the pin released, the plates will guide the members back to their primary position.

In operation the jumps are set up with the blocks moved to the desired height and the bars placed on the concave surfaces 16. Should the animal land on the bars the downward pressure of the members 25 and 27 will operate against the pressure of the springs 31 and 32 and allow the pin to separate from the opening 28 through the mouth 29, thus dropping the bars directly to the ground. When the jump is reassembled, the pin 20 is merely pushed through the opening 28 and the openings 14 or reset in the notched openings 12 and the bar replaced on the blocks. Of course, as soon as the pin 20 is released from the opening 28 the member 25 and the lever 27 will be forced back into position by the springs 31 and 32.

I claim:

1. A support for a jump bar comprising a supporting block, a standard, means for positioning said supporting block on said standard, said means comprising a pair of arms mounted on said block, a pin engaging said standard and means on said arms to engage said pin but to release said pin under extraordinary pressure, said means including a spring to return said arms to their normal position.

2. A support for a jump bar comprising a supporting block, a standard, means for positioning said supporting block on said standard, said means comprising an arm for releasably engaging a pin or rod comprising a rigid member and a cooperating lever forming with the rigid member an opening to engage said pin, spring means urging said rigid member and said lever toward each other but allowing their temporary separation under extraordinary pressure to release said pin.

3. A support for a jump bar comprising a supporting block, a standard, means for positioning said supporting block on said standard comprising a supporting pin or rod, an arm for engaging said pin or rod comprising a rigid member and a cooperating lever forming with the rigid member a jaw to engage said pin, spring means urging said rigid member and said lever together to position said jaw but allowing their separation under extraordinary pressure to release said pin, and guide means to reposition said lever.

4. A support for a jump bar comprising a supporting block, a standard, means for positioning said supporting block on said standard comprising a pin, a rigid member and a cooperating lever forming with the rigid member a pair of jaws to engage said pin, a bolt extending through the rigid member and the lever and projecting beyond each of said members, a spring on each end of said bolt urging said members together but allowing their separation under extraordinary pressure.

References Cited in the file of this patent

UNITED STATES PATENTS

| | | |
|---|---|---|
| 1,424,348 | Farber | Aug. 1, 1922 |
| 2,614,783 | Spear | Oct. 21, 1952 |
| 2,706,631 | Holmes | Apr. 19, 1955 |
| 2,718,397 | Verkuilen | Sept. 20, 1955 |